US008408267B2

(12) United States Patent
Hafner et al.

(10) Patent No.: US 8,408,267 B2
(45) Date of Patent: Apr. 2, 2013

(54) VACUUM CYLINDER FOR A LABELING APPARATUS

(75) Inventors: Dieter Hafner, Regensburg (DE); Gundolf Kipper, Gebelkofen (DE)

(73) Assignee: Krones AG, Neutraubling (DE)

( * ) Notice: Subject to any disclaimer, the term of this patent is extended or adjusted under 35 U.S.C. 154(b) by 714 days.

(21) Appl. No.: 12/301,720

(22) PCT Filed: May 18, 2007

(86) PCT No.: PCT/EP2007/004431
§ 371 (c)(1),
(2), (4) Date: Apr. 28, 2009

(87) PCT Pub. No.: WO2007/134802
PCT Pub. Date: Nov. 29, 2007

(65) Prior Publication Data

US 2009/0205786 A1 Aug. 20, 2009

(30) Foreign Application Priority Data

May 20, 2006 (DE) .................... 20 2006 008 109 U

(51) Int. Cl.
*B32B 37/00* (2006.01)

(52) U.S. Cl. ......................... 156/538; 156/556; 156/566

(58) Field of Classification Search .................. 156/285; 269/21
See application file for complete search history.

(56) References Cited

U.S. PATENT DOCUMENTS

| | | | | |
|---|---|---|---|---|
| 3,404,059 A * | 10/1968 | Ritterhoff | 156/363 |
| 3,505,145 A * | 4/1970 | Halvard et al. | 156/265 |
| 4,123,310 A * | 10/1978 | Varon et al. | 156/351 |
| 4,124,433 A * | 11/1978 | Herdzina et al. | 156/456 |
| 4,244,763 A | 1/1981 | Varon et al. | |
| 2002/0026987 A1* | 3/2002 | Anderson et al. | 156/566 |

FOREIGN PATENT DOCUMENTS

WO WO 01/17858 A1 3/2001

OTHER PUBLICATIONS

International Search Report for PCT Application No. PCT/EP2007/004431, dated Dec. 4, 2007.

* cited by examiner

*Primary Examiner* — James Sells
(74) *Attorney, Agent, or Firm* — Novak Druce Connolly Bove + Quigg LLP

(57) ABSTRACT

A vacuum cylinder for a labeling apparatus may include a bottom support and a plurality of spaced-apart supporting elements. The bottom support may have a receiving opening for receiving a shaft in a rotationally fixed manner. The supporting elements may have a longitudinal dimension extending substantially perpendicular to a plane of the bottom support. Each of the supporting elements may be releasably connected to the bottom support via a first end section, and the bottom support may have a plurality of cutouts arranged in a radial direction of the bottom support between the receiving opening and the supporting elements.

17 Claims, 2 Drawing Sheets

VACUUM CYLINDER FOR A LABELING APPARATUS

CROSS-REFERENCE TO RELATED APPLICATION

This application is filed under 35 U.S.C. 371 as a U.S. national phase application of PCT/EP2007/004431, having an international filing date of May 18, 2007, which claims the benefit of DE 20 2006 008 109.7 haying a filing date of May 20, 2006, the contents of which are hereby incorporated by reference in their entirety.

TECHNICAL FIELD

The invention relates to a vacuum cylinder, in particular for labeling apparatuses.

BACKGROUND

Such labeling apparatuses are known from the prior art. In a method known from the prior art, labels are taken from a continuous roll, are temporarily sucked onto a vacuum cylinder, and from there are transferred to a target location such as a bottle for example. For this purpose, the labeling apparatuses or the vacuum cylinders thereof have suction strips which temporarily hold the labels for example by means of a suction effect. These vacuum cylinders usually comprise a pot-shaped base region with a cover placed thereon. The vacuum cylinders known from the prior art operate satisfactorily, but have a very high weight of up to 50 kg. The replacement of one vacuum cylinder with another vacuum cylinder is therefore a very complicated procedure.

The object of the present invention is therefore to reduce the weight of the vacuum cylinders. In addition, the intention is also to provide vacuum cylinders which can be adapted to different label heights with little complexity. Another object is to reduce the production or manufacturing costs of the vacuum cylinders.

SUMMARY OF THE INVENTION

According to one aspect of the invention, a vacuum cylinder for a labeling apparatus may include a bottom support and a plurality of spaced-apart supporting elements. The bottom support may have a receiving opening for receiving a shaft in a rotationally fixed manner. The supporting elements may have a longitudinal dimension extending substantially perpendicular to a plane of the bottom support. Each of the supporting elements may be releasably connected to the bottom support via a first end section, and the bottom support may have a plurality of cutouts arranged in a radial direction of the bottom support between the receiving opening and the supporting elements.

The vacuum cylinder according to the invention for a labeling apparatus comprises a bottom support and a plurality of at least partially spaced-apart supporting elements. The longitudinal directions of the supporting elements extend essentially perpendicular to the plane of the bottom support, and the bottom support has a receiving opening for receiving a shaft in a rotationally fixed manner. According to the invention, the supporting elements are in each case releasably connected to the bottom support via a first end section, and the bottom support has a plurality of cutouts which are arranged in the radial direction of the bottom support between the receiving opening and the supporting elements.

By providing a plurality of cutouts, the weight of the bottom support and therefore that of the vacuum cylinder can be reduced. In addition, the costs of producing the vacuum cylinder can be reduced since the cylinder does not have any pot-shaped region which is produced by a complicated method, but rather has an essentially planar bottom support. Furthermore, by providing a plurality of releasable supporting elements, the production costs for the vacuum cylinder can be reduced since the bottom support can be made from identical and essentially planar individual parts, and therefore no bending processes are required.

Another advantage of the vacuum cylinder according to the invention is that it can easily be adapted to different label heights by replacing the supporting elements for example with supporting elements of a different length.

Advantageously, the bottom support has a plurality of essentially radially extending arms, between which the respective cutouts are provided.

In a further advantageous embodiment, the vacuum cylinder has a fixing ring which preferably connects some end sections of the supporting elements to one another in a force-fitting and releasable manner. In this way, the end sections can be stabilized with respect to one another, and thus the stability of the vacuum cylinder can be increased. However, it is also possible to introduce webs between the bottom support and the fixing ring, which webs increase the stability of the vacuum cylinder. The advantage of this solution is then the fact that the end sections do not have to be connected to the bottom support or the fixing ring in a force-fitting manner, since the stabilization of the vacuum cylinder takes place essentially via the webs.

Preferably, the fixing of the fixing ring to the end sections takes place via screw connections. Preferably, the fixing ring forms part of an upper support which has a plurality of webs protruding radially inwards. More specifically, the fixing ring is adjoined by a plurality of webs or arms which are in each case oriented essentially radially inwards. Here too, cutouts are provided between these individual webs, which cutouts are preferably designed in the same way as in the case of the bottom support. In one preferred embodiment, the bottom support and the upper support have an essentially identical shape. The shape preferably corresponds approximately to that of a spoked wheel or star wheel. In this way, too, the production costs can be reduced since overall a smaller number of different components are required.

In a further preferred embodiment, the upper support has a receiving opening which receives the shaft in an essentially rotationally fixed manner. In this way, a stabilization of the upper support with respect to the shaft can also be achieved, and the overall stability can thus also be increased.

In one preferred embodiment, the receiving opening of the upper support and also of the bottom support has a cross section selected from a group of non-circular cross sections comprising square cross sections, polygonal cross sections, elliptical cross sections and the like. However, it would also be possible to select circular cross sections with grooves or protrusions, in order in this way to achieve a rotationally fixed connection between the receiving opening and the shaft.

In a further advantageous embodiment, the supporting elements in each case have holding devices for holding suction strips. With particular preference, these suction strips protrude slightly from the circular circumference of the vacuum cylinder. These suction strips or the surfaces thereof serve to hold and to fix the respective starts and preferably also the ends of the labels to be transferred.

In one preferred embodiment, the holding devices are designed in the form of rails in order to insert the suction strips in the longitudinal direction of the supporting elements.

Preferably, the suction strips have an anti-adhesion coating on their outer surface. This coating will be explained in more detail with reference to the figures.

In a further preferred embodiment, a flexible material is arranged in an intermediate space between the supporting elements and the suction strips, which flexible material allows a movement of the suction strips relative to the supporting elements in the radial direction of the vacuum cylinder. This may be for example a layer of foam or rubber or the like. In the prior art, the surfaces of the suction strips themselves are elastic, but this causes problems in the event of soiling by the adhesives of the labels.

In a further preferred embodiment, at least some of the supporting elements can be moved in the circumferential direction of the vacuum cylinder. In this way, the precise position of the supporting elements can be accurately set and in some circumstances can be adapted to slightly changing conditions. With particular advantage, only every second supporting element can be moved in the circumferential direction of the vacuum cylinder. In this way, the number of degrees of freedom required in order to set the position of the supporting elements is reduced to a suitable number.

In a further preferred embodiment, in each case segments for temporarily holding labels are arranged in the circumferential direction of the vacuum cylinder between the supporting elements. While the abovementioned suction strips hold the starts and ends of the labels, said segments hold the respective central regions of the labels. It is also possible to provide both the segments and also the suction strips with openings, in order to be able to expose the outer surfaces thereof to a vacuum. In this way, a temporary hold of the labels on the segments can be achieved.

In the prior art, solid walls of the bottom support are provided instead of the segments of the vacuum cylinder, as a result of which the overall weight of the vacuum cylinder is increased. The segments, on the other hand, can be designed to be relatively thin (a few mm) and therefore provide a saving in terms of weight.

Preferably, the segments are screwed both to the bottom support and also to the upper support. The segments can thus also help to stabilize the vacuum cylinder as a whole.

Preferably, vacuum chambers are provided radially inside the segments, which vacuum chambers serve to suck air away from the outer surface of the segments. In the prior art, air channels are provided in the bottom support itself for this purpose. The suction of the air therefore had to take place over longer distances and with multiple changes of the air flow direction. By contrast, by providing vacuum chambers, relatively short vacuum lines can be selected between the segments and the central vacuum region. Preferably, the vacuum chambers are connected to a vacuum region of the bottom support via flexible lines or hoses. In addition, the suction strips are preferably also connected to the vacuum region of the bottom support via flexible lines. In this case it is possible to design the vacuum lines for both connections the same and thus likewise to reduce the number of different individual parts required.

The present invention also relates to a connecting piece for a vacuum line and a suction opening, wherein the connecting piece has an essentially cylindrical main body. According to the invention, the connecting piece has an inwardly protruding, at least partially circumferential collar which serves as a stop for the vacuum line, and also an outwardly protruding, at least partially circumferential collar which serves as a stop for the suction opening.

In the prior art, in order to connect the vacuum lines to suction points, connecting pieces with screw threads and seals are selected which are suitably screwed into the suction openings. These parts are also relatively heavy and are also more expensive to produce than the connecting pieces according to the invention.

It is therefore also possible to reduce the overall weight of the vacuum cylinder by using the connecting pieces. In addition, the connecting pieces can be inserted into the respective suction plates with a press fit and allow a satisfactory suction effect.

Preferably, the connecting piece has an essentially circular cross section. In a further preferred embodiment, the connecting piece is made from a plastic which is suitable for injection molding.

In a further advantageous embodiment, the inwardly protruding collar is arranged in a first end section of the main body, and with particular preference the outwardly protruding collar is arranged on a second end section of the main body. The inner and the outer collar are preferably designed to run around the entire circumference.

In a further preferred embodiment, the connecting piece is flexible, which facilitates a pressure-tight insertion into the suction points.

The present invention also relates to a labeling apparatus comprising a vacuum cylinder of the type described above. The invention also relates to a labeling machine comprising at least one connecting piece of the type described above.

BRIEF DESCRIPTION OF THE DRAWINGS

Further advantages and embodiments will emerge from the appended drawings, in which.

DETAILED DESCRIPTION

Figure 1:
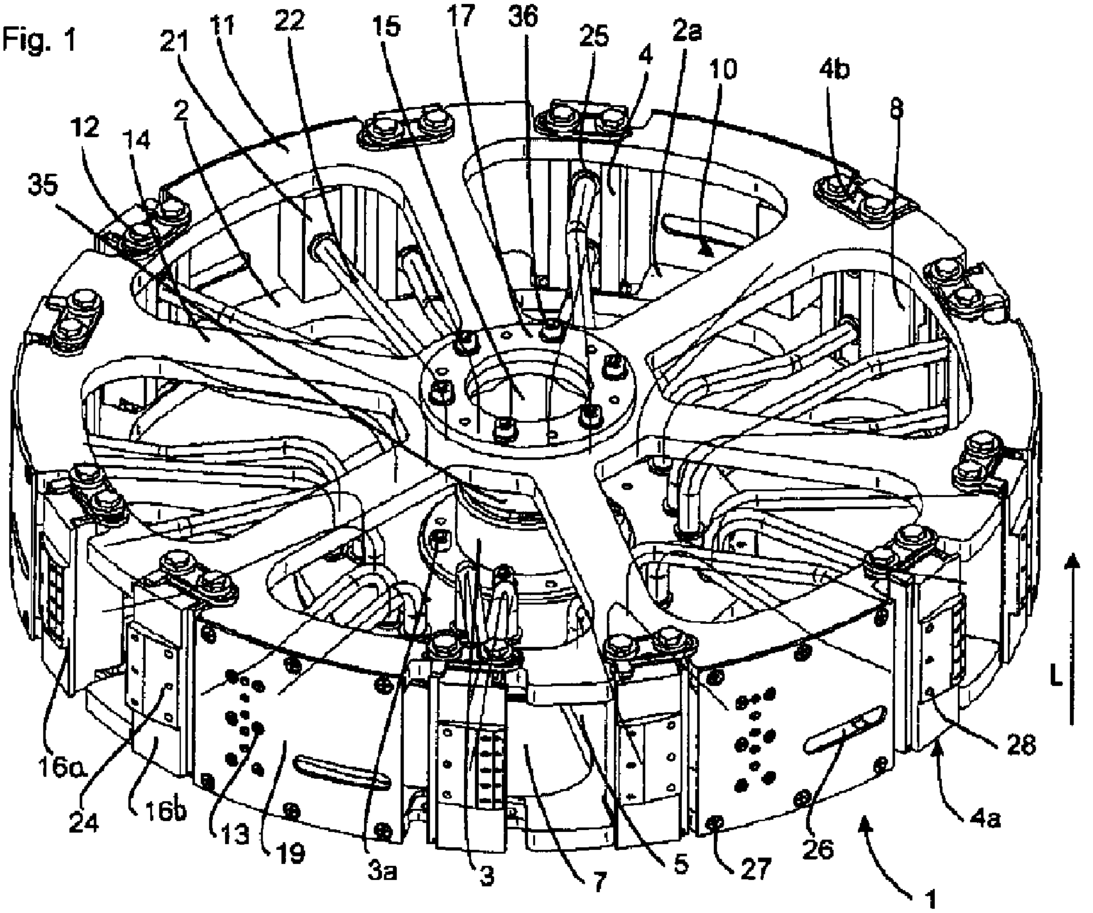
FIG. 1 shows a perspective oblique view of a vacuum cylinder according to the invention.

FIG. 1 shows a perspective oblique view of a vacuum cylinder 1 according to the invention. This vacuum cylinder 1 comprises a bottom support 2, although this is largely hidden in FIG. 1. This bottom support 2 is of rotationally symmetrical design here and has a plurality of webs 5 extending in the radial direction, although these webs are also partially hidden.

Cutouts 7 are in each case provided between these individual webs 5. These cutouts bring about a weight reduction of the vacuum cylinder as a whole. At the same time, however, the stability is barely affected compared to vacuum cylinders known from the prior art.

Reference 4 denotes supporting elements which connect the bottom support 2 to an upper support 10. Here, the longitudinal direction L of the supporting elements 4 is perpendicular to the plane of the bottom support 2.

Figure 2:
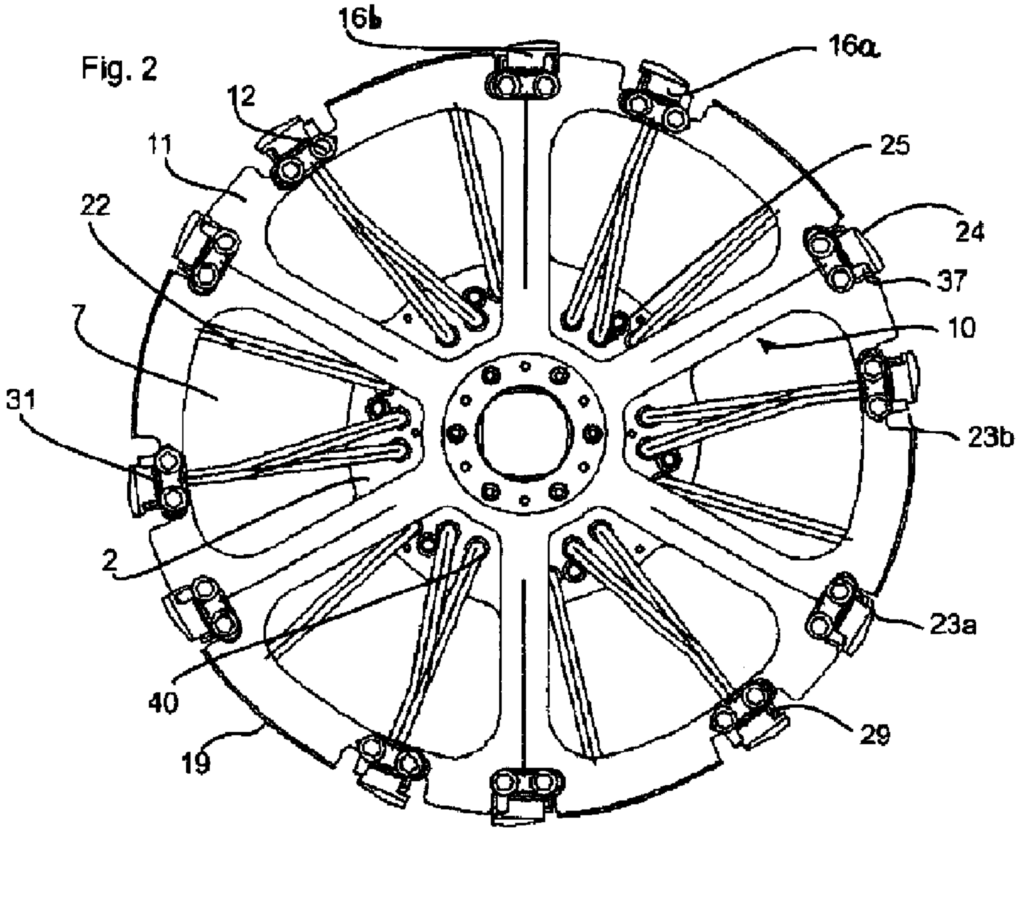
FIG. 2 shows a plan view of the vacuum cylinder of FIG. 1.

In FIG. 2, the plane of the bottom support 2 runs in the plane of the figure, and the longitudinal direction L of the supporting elements 4 is perpendicular thereto.

The supporting elements 4 or the first end sections 4*a* thereof are in each case releasably connected to the bottom support 2 via screw connections (not shown). Due to this releasability, a replacement of the individual supporting elements and also a displacement of the supporting elements in the circumferential direction of the vacuum cylinder 1 is also possible in a relatively simple manner.

The individual webs 5 widen in the circumferential direction in each case at their radially outer ends, in order in this way to increase the stability.

Reference 3 denotes a hub for receiving a shaft (not shown). This hub 3 has a receiving opening (not shown) for receiving the shaft, the shaft being received in a rotationally fixed manner, as mentioned above. The lower hub 3 is screwed to the bottom support 2 by a plurality of screw connections 3*a*.

The bottom support 2 has a ring 2*a* running in the circumferential direction, to which the individual supporting elements 4 are fixed. The upper support 10 is designed here in essentially the same way as the bottom support 2. This means that the upper support 10 also has a plurality of webs 14, between which respective cutouts 8 are arranged in order to reduce the weight.

Reference 11 denotes a fixing ring, by means of which the individual supporting elements 4 or the upper end sections 4*b* thereof are connected to one another.

In its centre, the upper support 10 likewise has a receiving opening 15 for receiving the shaft. Reference 17 denotes a fixing ring, by means of which a hub 35 of the upper support 10 is fixed to the latter by a plurality of screws 36. In this embodiment, therefore, two separate hubs 3, 35 are provided, so that the overall weight of the vacuum cylinder can be further reduced (due to the material-free intermediate space between the hubs 3, 35).

The fixing of the supporting elements 4 to the bottom support and the upper support 10 takes place via a plurality of screw connections 12. References 16*a*, 16*b* denote suction strips which hold the start and end of a label. In the embodiment shown here, a total of 12 such suction strips 16*a*, 16*b* are provided. During operation, in each case the start of a label is arranged at the suction strips 16*a* and the end of the label is arranged at the suction strips 16*b*.

Segments 19 are in each case provided in the circumferential direction between these two suction strips 16*a*, 16*b*, that is to say in the region which during operation lies between the start of the label and the end of the label. In the prior art, this region is a solid wall which has approximately the same thickness as the bottom support 2 itself. According to the invention, however, the thickness of the segments here is much smaller, in order in this way to save weight. Preferably, their thickness is only a few millimeters, and they are preferably made from metal. The segments 19 are connected both to the bottom support 2 and also to the upper support 10 via a plurality of screw connections 27. On their surface, the segments 19 have a plurality of suction openings 13 for air, which are arranged here in suction rows. Reference 26 denotes an opening which is elongated in the circumferential direction of the segment 19 and which serves for optical monitoring of the presence of labels during operation. Located radially behind these suction openings 13 are vacuum chambers 21, which are connected to central suction points 25 (also shown in FIG. 2) via vacuum lines 22. Such openings 28 for sucking air are also provided in the suction strips 16*a*, 16*b*. Depending on the size of the labels to be transferred, it would also be possible to provide more than the shown suction openings.

FIG. 2 shows a plan view of a vacuum cylinder from FIG. 1. It can be seen that both the bottom support 2 and the upper support 10 in each case have recesses 23*a*, 23*b*, in which the individual suction strips 16*a*, 16*b* are arranged. Here, the respective second recesses 23*b* in the circumferential direction are wider than the width of the suction strips 16 in the circumferential direction. In this way, the respective second suction strips 16*b*, which in this case are the suction strips for the end section of the label, can be moved in the circumferential direction. A certain degree of adaptation to different labels and machine types can thus take place.

In this embodiment, those suction strips 16*a* which are in each case assigned to the starts of the labels essentially cannot move in the circumferential direction. Reference 31 denotes a quick-clamping ring which here, unlike in the prior art, is designed in a circumferential, i.e. closed, manner. This quick-clamping ring has a protrusion 37, through the displacement of which it is possible to release the individual suction strips 16*a*, 16*b*. More specifically, once the quick-clamping ring has been opened, the individual suction strips can be removed from the vacuum cylinder in a direction perpendicular to the plane of the figure.

It can be seen that the individual suction strips 16*a*, 16*b* in each case have an angled surface 24 which points in the direction of the segments 19. The individual angled surfaces 24 also protrude slightly beyond the circumference of the vacuum cylinder or the two supports 2 and 10 and also the segments 19, which makes it easier to pick up labels from an endless belt and prevents corrugations of the labels.

It can also be seen that the supporting elements 4 in each case have receiving grooves 29 for receiving the suction strips 16*a*, 16*b*.

Figure 3:
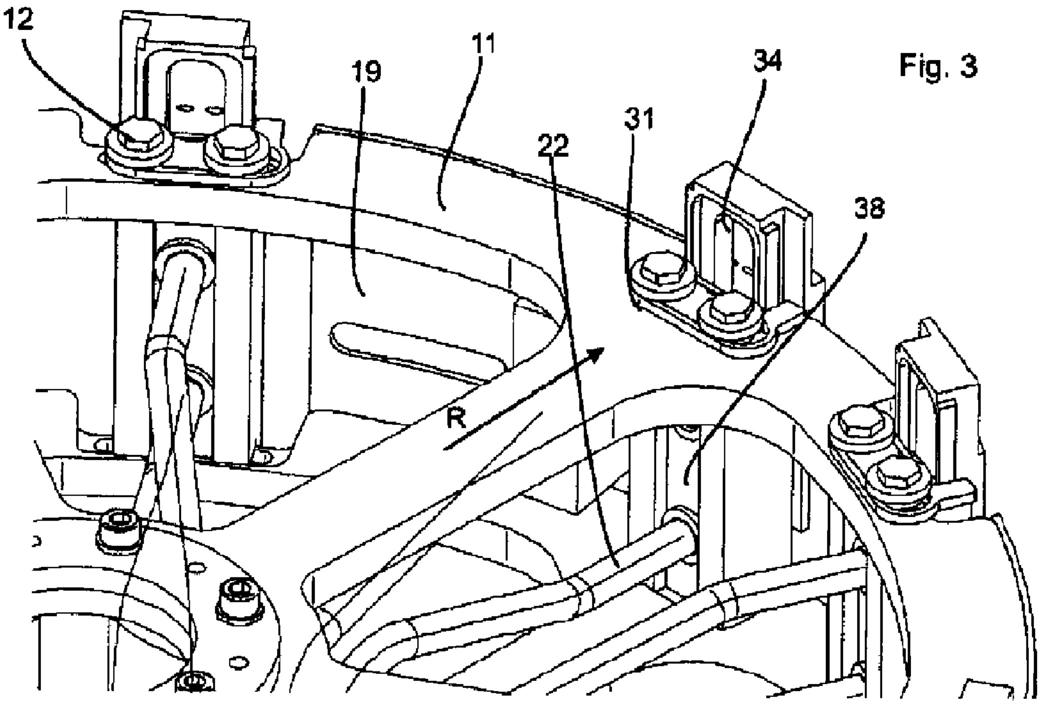
FIG. 3 shows a detail view of the vacuum cylinder with suction strips partially pushed out.

FIG. 3 shows a vacuum cylinder, wherein here the individual suction strips 16*a*, 16*b* are not yet pushed fully into the vacuum cylinder in their longitudinal direction L. In their inner side, i.e. the side pointing radially inwards, the suction strips have a depression 34, in which a flexible material 18 (FIG. 4) can be inserted, such as for example a piece of foam (for example made from Sylomer). In this way, the suction strips 16*a*, 16*b* can be moved slightly relative to the bottom support 2 and also the upper support 10 in the direction R and in the direction opposite thereto.

By means of the quick-clamping ring 31, the lock between the suction strips 16*a*, 16*b* and the supporting element 4 can be opened and in this way the suction strips 16*a*, 16*b* can easily be removed.

The supporting element 4 has a rear wall 38, in which two openings are provided for the insertion of vacuum lines 22. The vacuum line 22 is in each case connected to the rear wall 38 via the connecting pieces 40 which are likewise according to the invention. In the embodiment shown here, the suction strips 16*a*, 16*b* are in each case supplied by two vacuum lines, while the vacuum chambers 21 behind the segments 19 are in each case supplied by a vacuum line 21. However, the number of these vacuum lines 22 can also be varied.

Figure 4:
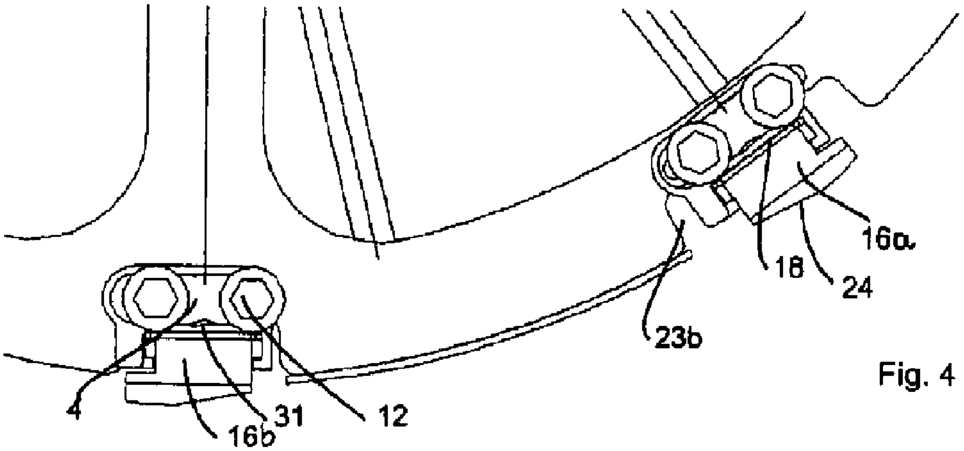
FIG. 4 shows a plan view of the view from FIG. 3.

FIG. 4 shows a detail view of the diagram from FIG. 3.

The thickness of the segments 19 is between 1 mm and 5 mm, preferably approximately 2 mm. It is also possible to see in FIG. 4 the flexible material 18 which allows a movement of the suction strips 16*a*, 16*b* relative to the supporting elements 4 and thus relative to the bottom support 2 and also the upper support 10. Preferably, both the suction strips 16*a*, 16*b* and also the segments 19 are provided with an anti-adhesion coating or traction coating. In this way, the frictional resistance can be increased for improved web transport, which is particularly beneficial in paper, foil and film production. In addition, adhesive from the labels can be removed more easily from the segments 19 and the suction strips 16*a*, 16*b*.

The thickness of said anti-adhesion coatings is between 0.01 mm and 2.0 mm, preferably between 0.1 mm and 0.2 mm. The hardness of the individual coatings is between 20 HRC and 100 HRC and preferably between 30 HRC and 80 HRC and particularly preferably between 65 HRC and 72 HRC. The roughness Ra of the coatings which are provided is between 5 and 15 μm and preferably between 6 and 9 μm.

The coatings which are used are designed for continuous operation at up to 200° C. and for maximum temperatures of more than 250° C.

Figure 5A:
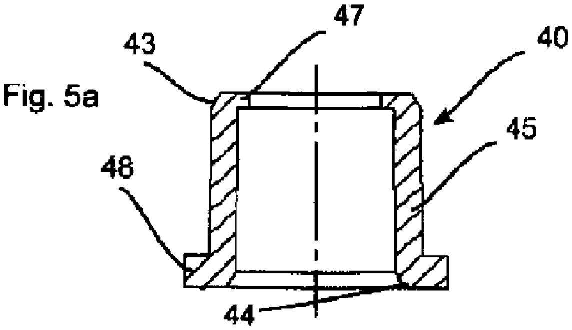
FIG. 5*a* shows a connecting piece according to the invention in a first diagram.
Figure 5B:
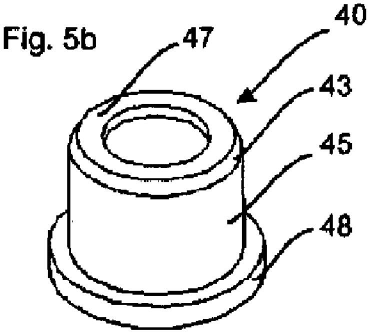
FIG. 5*b* shows the connecting piece of FIG. 5*a* in a second diagram.

FIGS. 5*a* and 5*b* show a connecting piece 40 for connecting a vacuum line 22 to the suction point 25. This connecting piece is made from a plastic and in particular from a plastic which is suitable for injection molding. The connecting piece has on its main body 45 an essentially circular cross section and has on its inner circumference a stop 47 for the vacuum line 22 in the form of a circumferential collar. A further collar 48 which protrudes outwards is defined as a stop for the suction point 25. Preferably, the connecting piece 40 is also flexible in its radial direction, in order in this way to achieve a secure hold of the vacuum line in the suction opening 25 and an improved sealing effect. Reference 44 denotes an insertion bevel for inserting the vacuum line 22, and reference 43 denotes an insertion bevel for inserting the connecting piece 40 into the suction points 25.

All of the features disclosed in the application documents are claimed as essential to the invention in so far as they are novel individually or in combination with respect to the prior art.

What is claimed is:

1. Connecting piece for a vacuum line and a suction opening, the connecting piece comprising:

an essentially cylindrical main body having a first end and a second end, the main body having a through bore extending from a first opening at the first end to a second opening at the second end;

an at least partially circumferential first collar at the first end of the main body, the first collar protruding radially inward into the through bore and sized and arranged such that a conduit inserted into the through bore at the second end and having an outside diameter sized to substantially match an inner diameter of the through bore will be stopped from exiting the first end of the main body by the first collar; and an at least partially circumferential second collar at the second end of the main body, the second collar protruding radially outward from the main body and sized and arranged such that a conduit placed over the main body at the first end and having an inside diameter sized to substantially match an outer diameter of the main body will be stopped from extending beyond the second end of the main body by the second collar.

2. Connecting piece according to claim 1, wherein the connecting piece is made from an injection-moldable plastic.

3. Labeling apparatus comprising:

at least one suction opening associated with the vacuum cylinder; and a connecting piece according to claim 1 for connecting a vacuum line to the suction opening.

4. Vacuum cylinder for a labeling apparatus, comprising:

a substantially planar bottom support, the bottom support having a receiving opening for receiving a shaft in a rotationally fixed manner;

a top support spaced from the bottom support; and a plurality of supporting elements, each element having a first end and a second end, the first end of each support element being releasably coupled to the bottom support and the second end of each support element being coupled to the top support, the supporting elements being spaced apart about peripheries of the bottom support and the top support, the supporting elements having a longitudinal dimension extending substantially perpendicular to the plane of the bottom support, the bottom support having a plurality of cutouts arranged in a radial direction of the bottom support between the receiving opening and the supporting elements.

5. Vacuum cylinder according to claim 4 wherein each of the supporting elements is releasably connected to the bottom support via a first end section.

6. Vacuum cylinder according to claim 4, further comprising a fixing ring that releasably couples at least some second end sections of the supporting elements to one another.

7. Vacuum cylinder according to claim 6, wherein the fixing ring forms part of an upper support which has a plurality of spokes protruding radially inwards.

8. Vacuum cylinder according to claim 7, wherein the upper support has a second receiving opening for receiving the shaft in a substantially rotationally fixed manner.

9. Vacuum cylinder according to claim 4, wherein each of the supporting elements includes holding devices for holding suction strips.

10. Vacuum cylinder according to claim 9, further comprising a flexible material arranged in an intermediate space between the supporting elements and the suction strips, the flexible material allowing a movement of the suction strips relative to the supporting elements in a radial direction of the vacuum cylinder.

11. Vacuum cylinder according to claim 9, wherein the suction strips have an outer surface with an anti-adhesion coating.

12. Vacuum cylinder according to claim 4, further comprising segments for temporarily holding labels, each of said segments being arranged in a circumferential direction of the vacuum cylinder between the supporting elements.

13. Vacuum cylinder according to claim 12, further comprising vacuum chambers radially inside the segments.

14. Vacuum cylinder according to claim 12, wherein the segments have an outer surface with an anti-adhesion coating.

15. Vacuum cylinder according to claim 13, wherein the vacuum chambers are connected to a vacuum region of the bottom support via flexible lines.

16. Vacuum cylinder according to claim 6, wherein the bottom support and the fixing ring each have hubs in their receiving opening, wherein the hubs are removably coupled to one another.

17. Labeling apparatus comprising a vacuum cylinder according to claim 4.

* * * * *